UNITED STATES PATENT OFFICE.

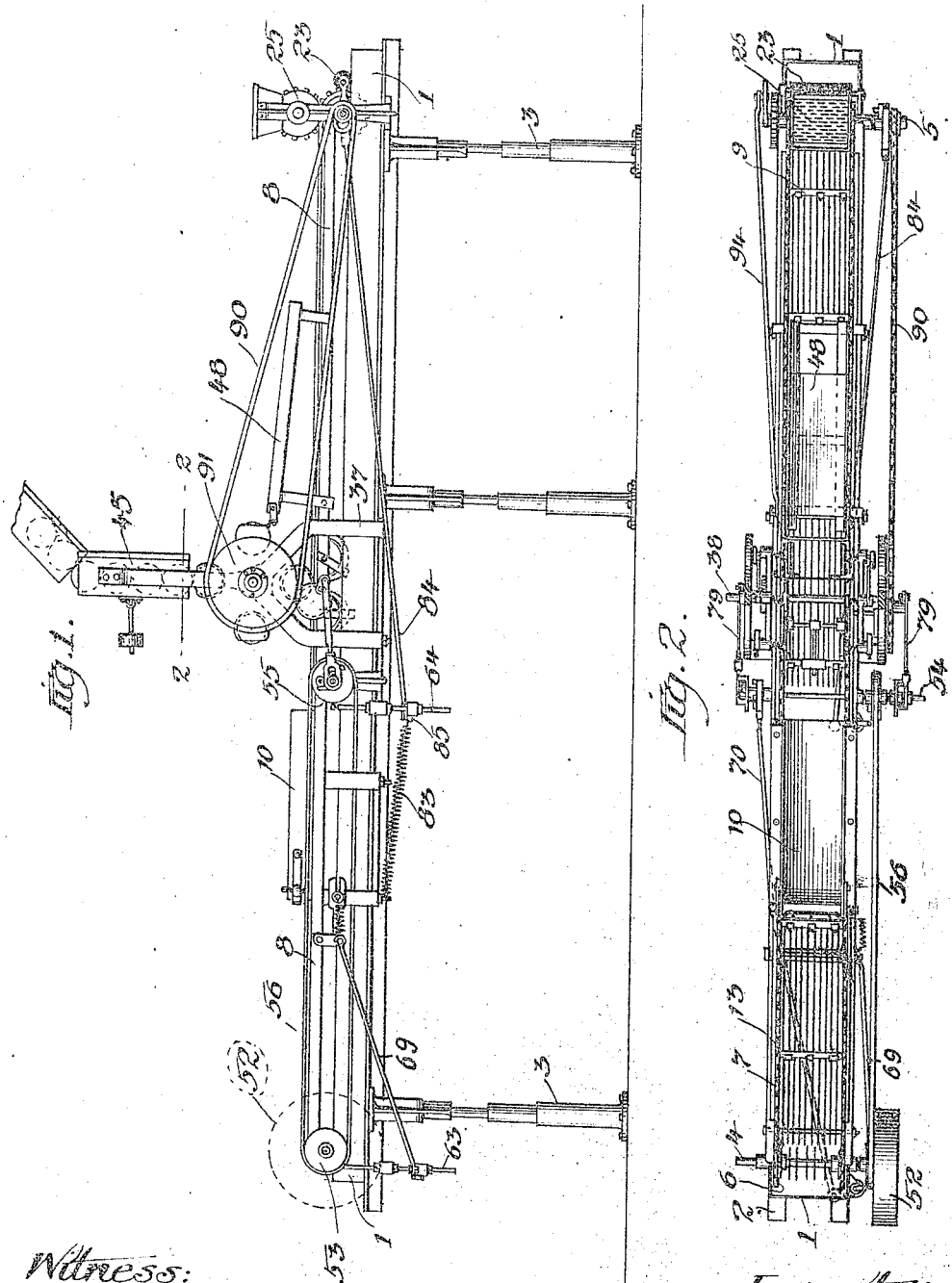

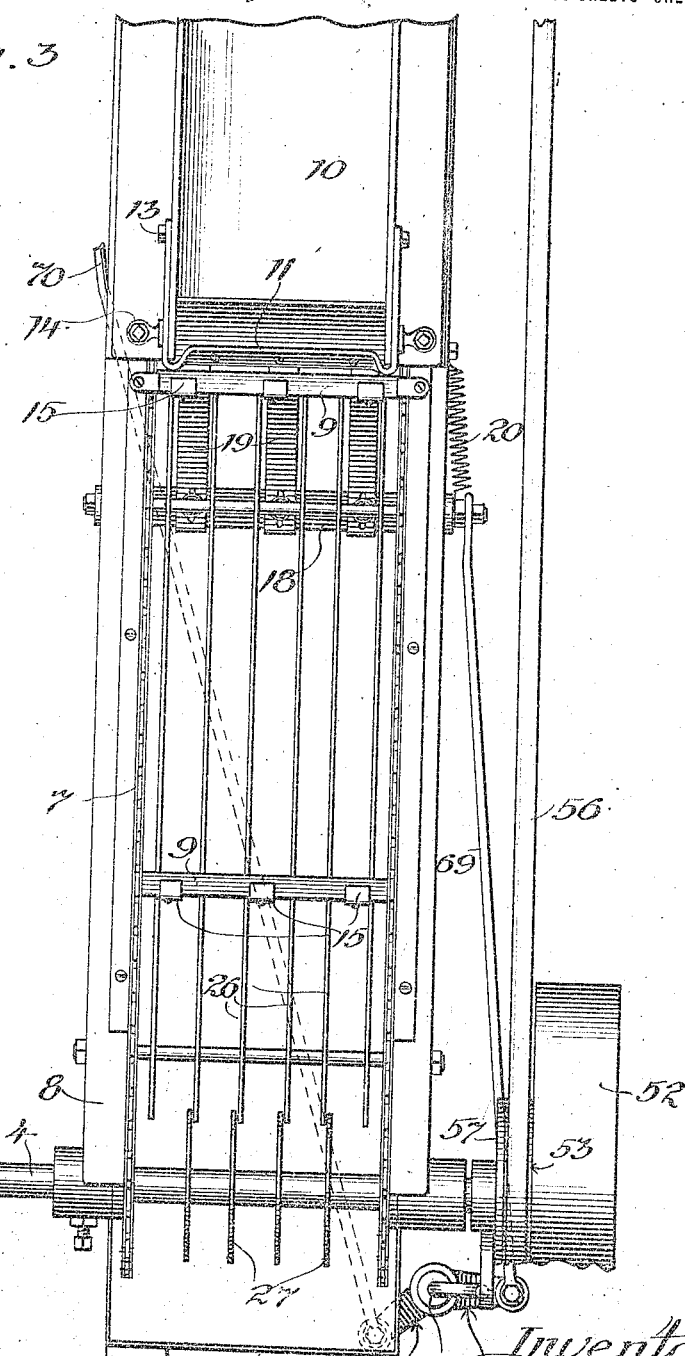

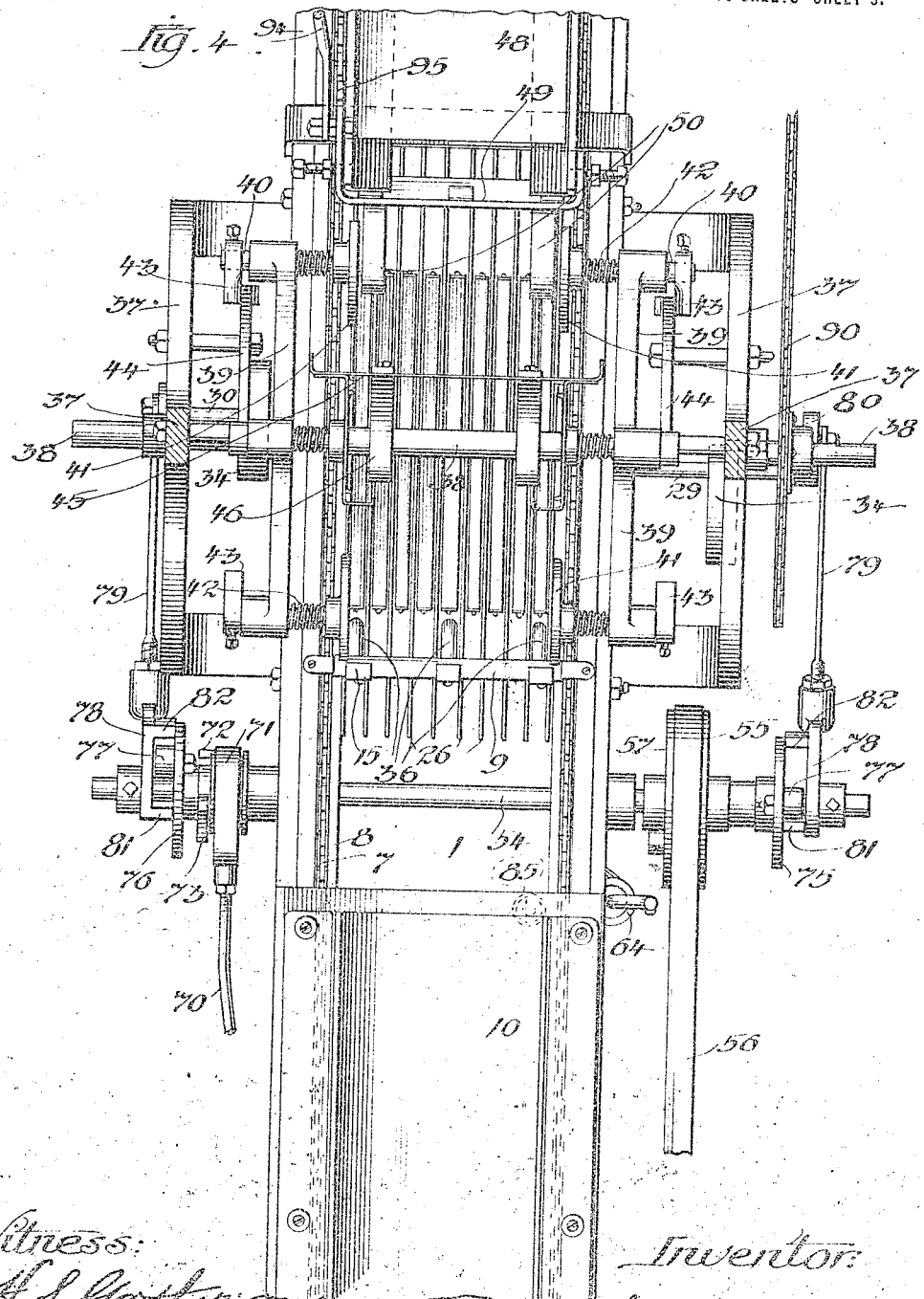

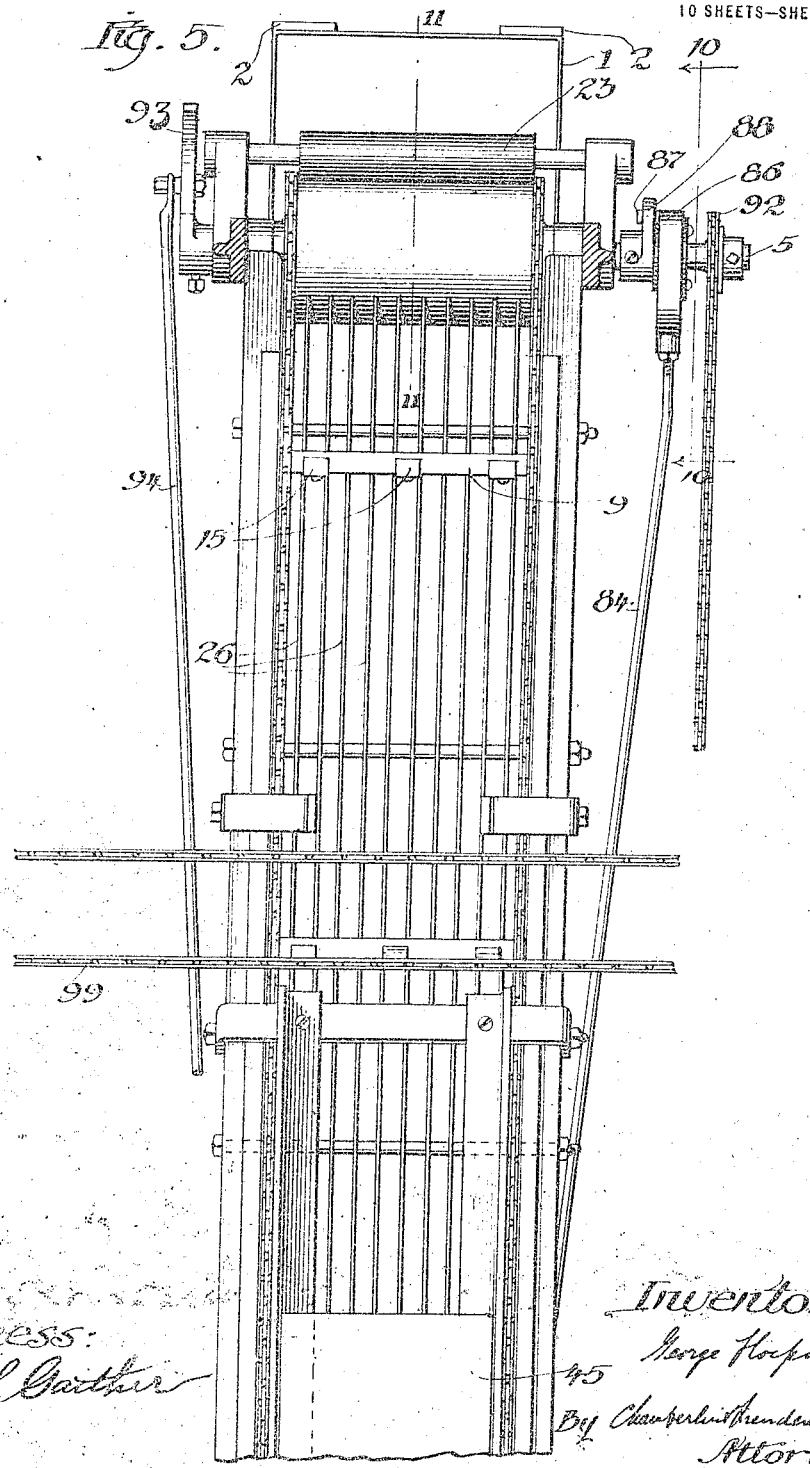

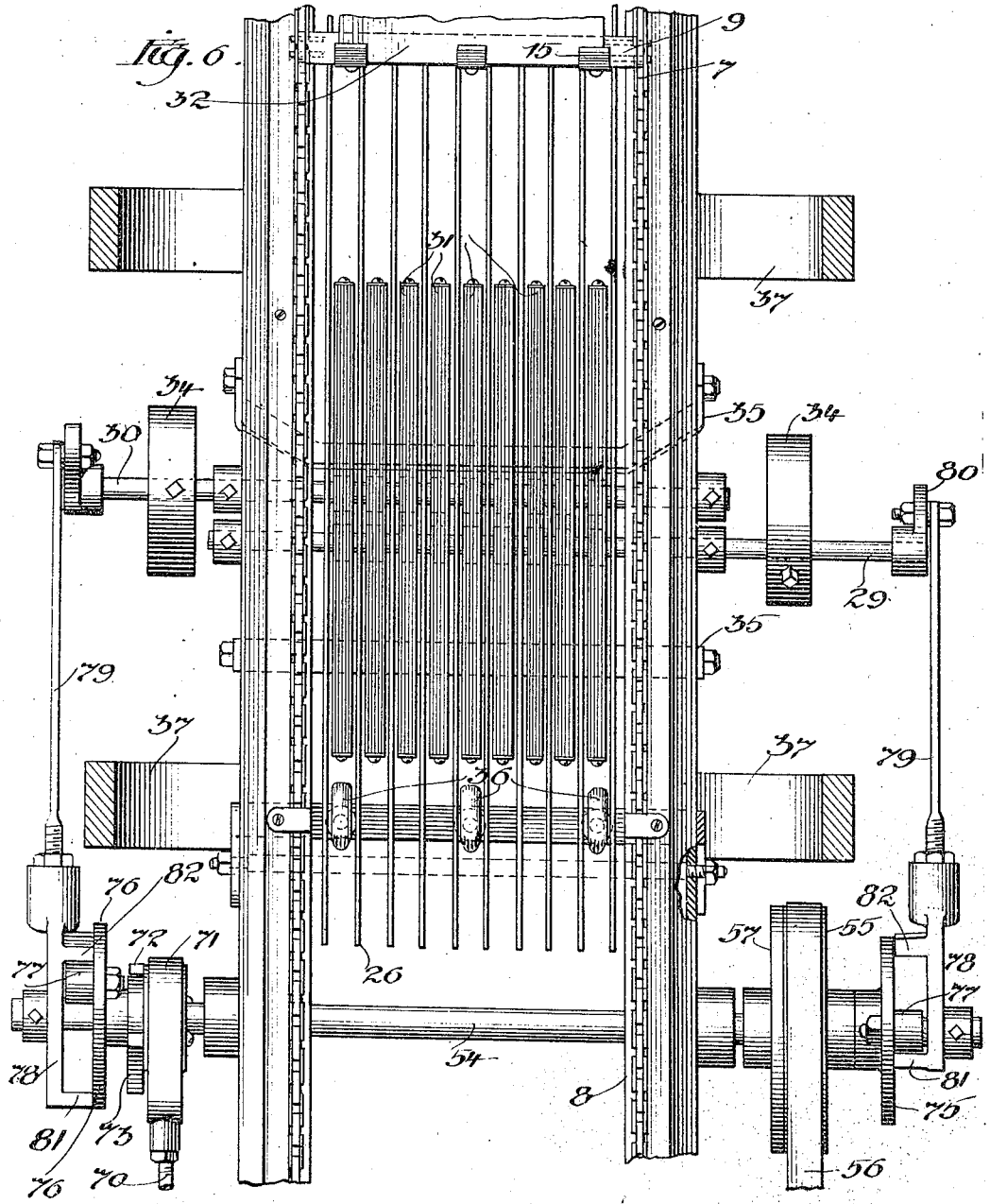

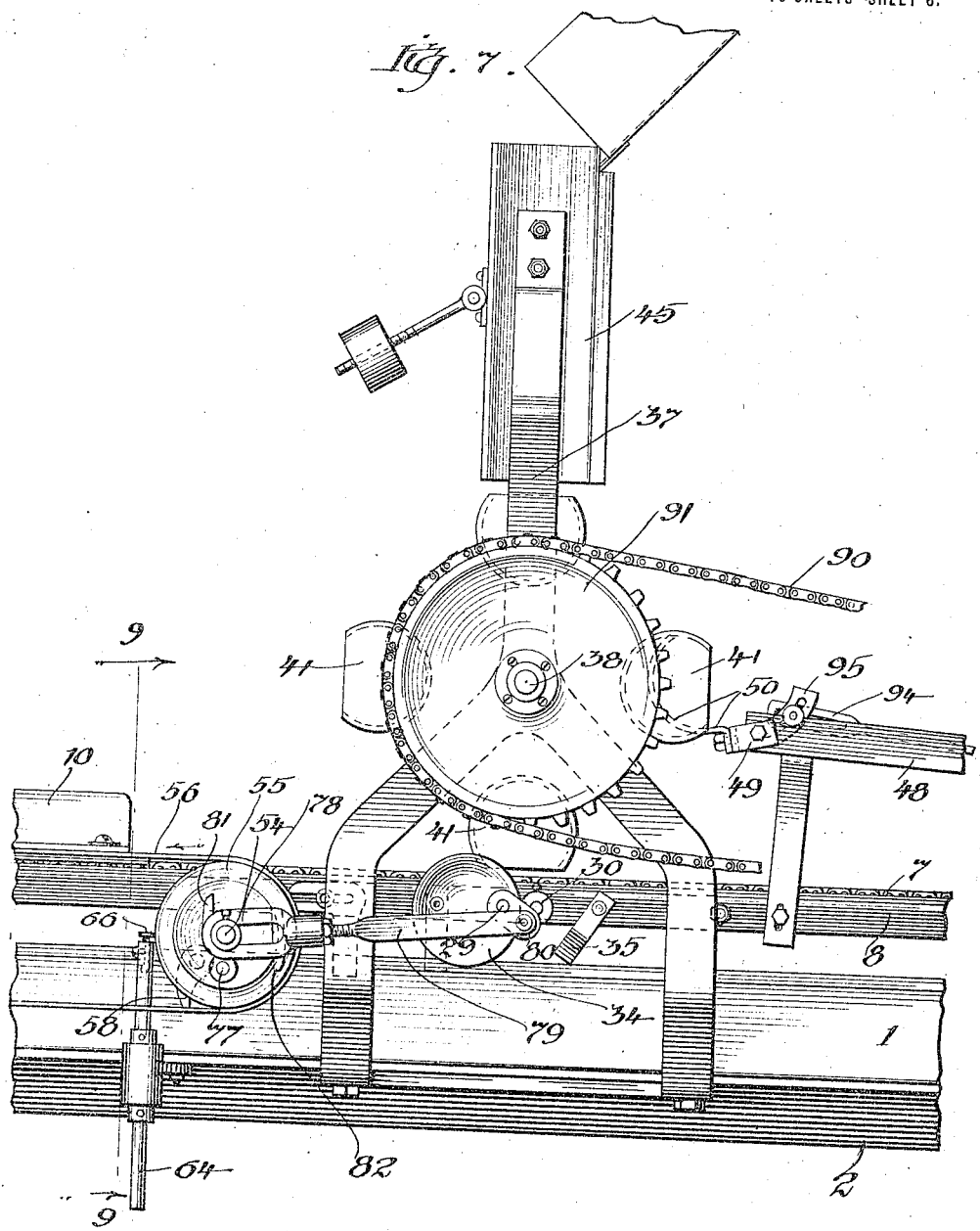

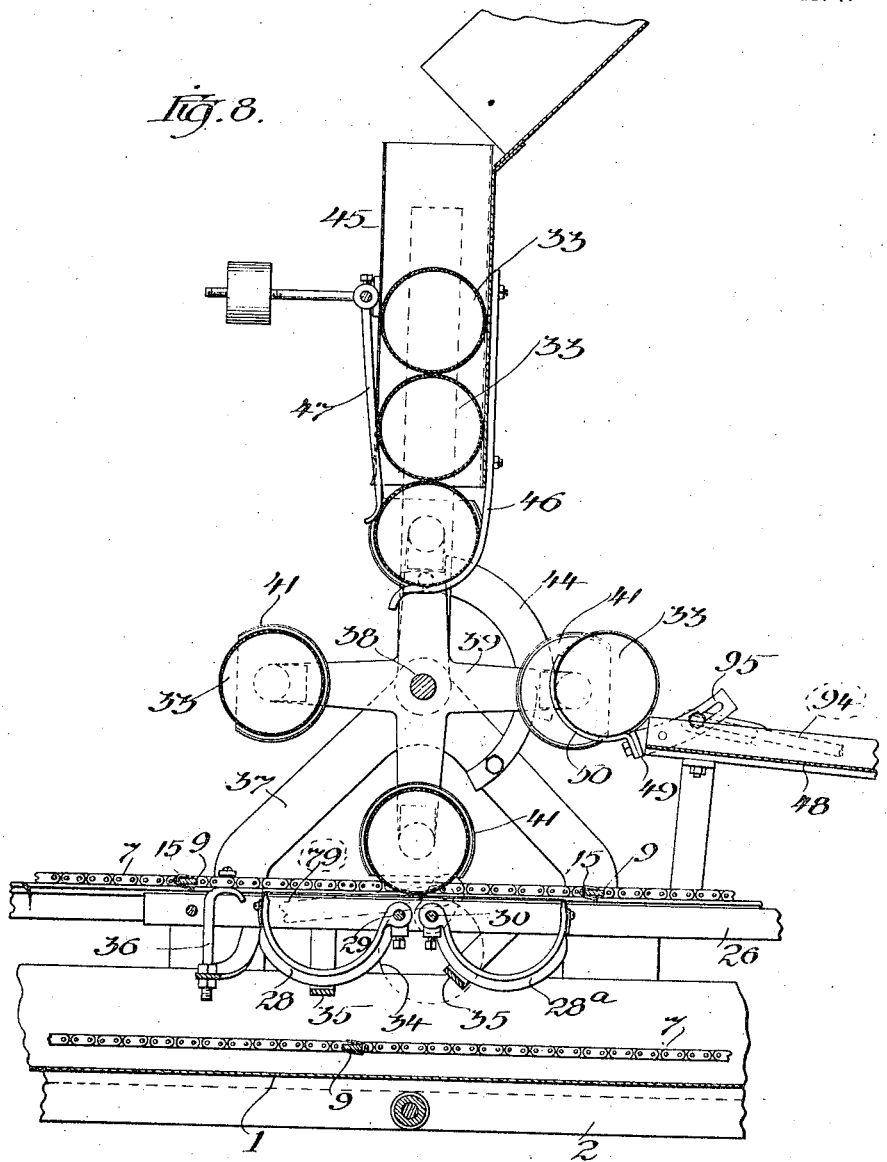

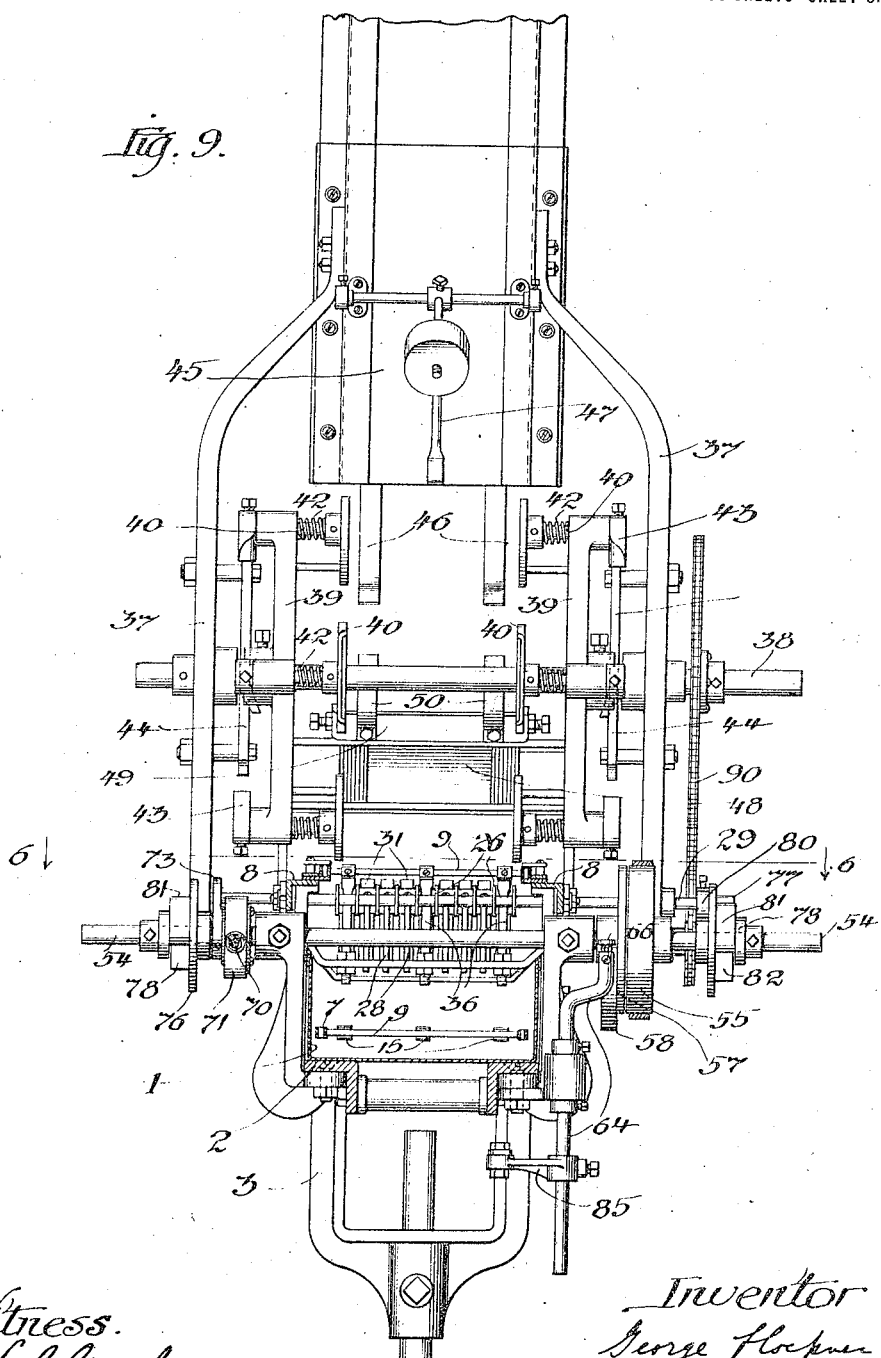

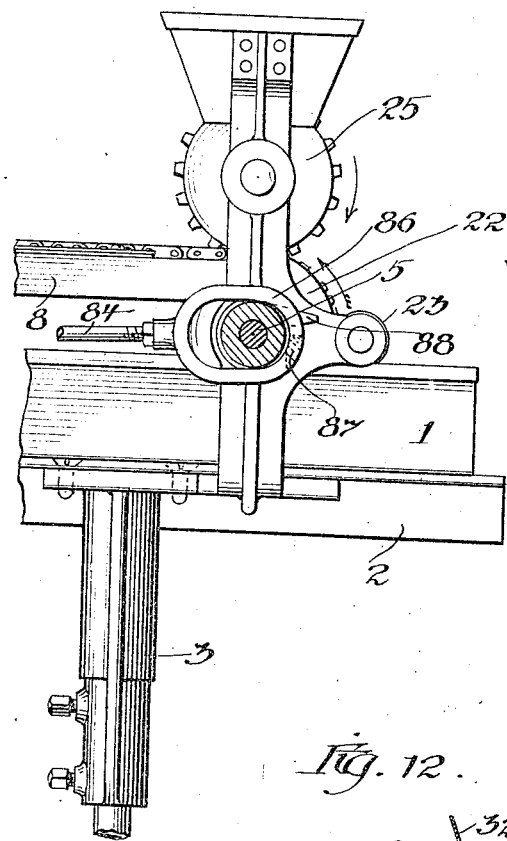
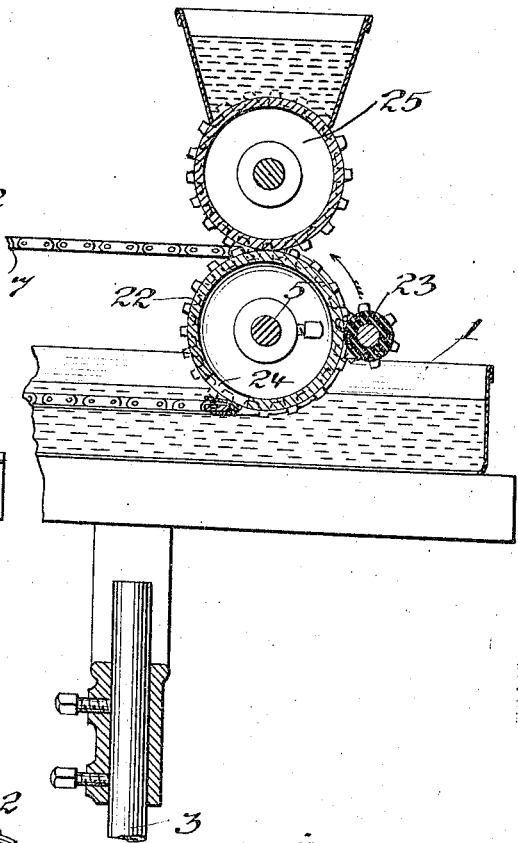
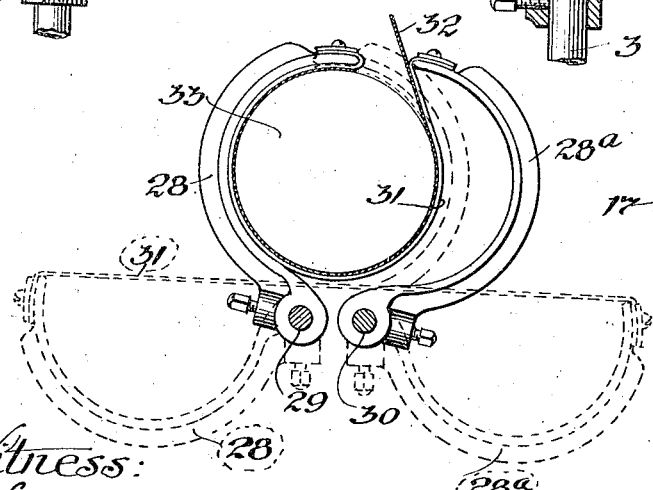
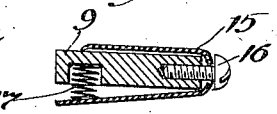

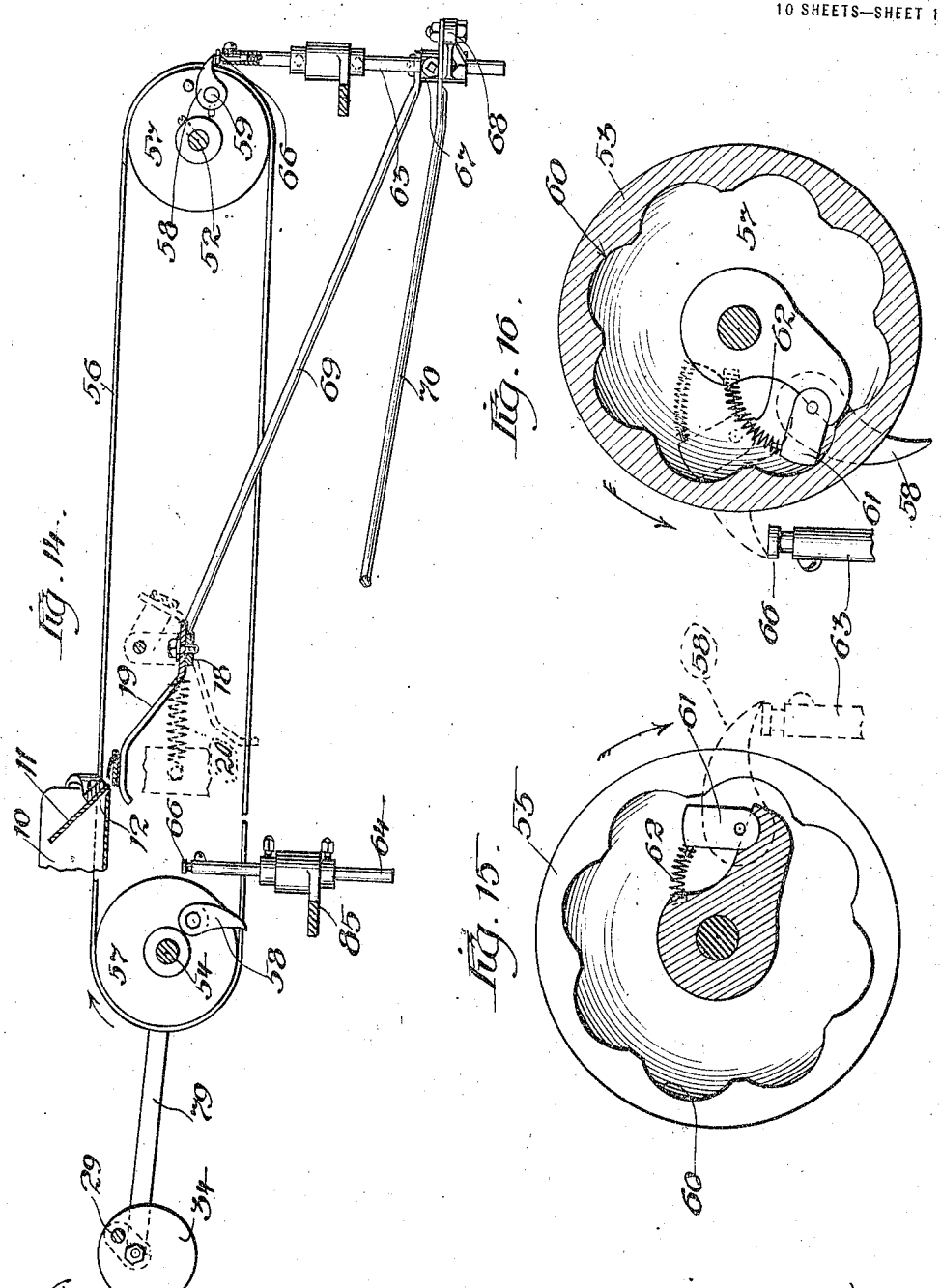

GEORGE HOEPNER, OF CHICAGO, ILLINOIS.

LABELING-MACHINE.

1,227,139.  Specification of Letters Patent.  Patented May 22, 1917.

Application filed June 7, 1915. Serial No. 32,515.

*To all whom it may concern:*

Be it known that I, GEORGE HOEPNER, a citizen of the United States, residing at Chicago, county of Cook, State of Illinois, have invented a certain new and useful Improvement in Labeling-Machines, and declare the following to be a full, clear, and exact description of the same, such as will enable others skilled in the art to which it pertains to make and use the same, reference being had to the accompanying drawings, which form a part of this specification.

My invention relates to the art of applying labels and has for its object to produce a machine which shall operate expeditiously and economically to secure labels around cans in such a way as to cause the labels to fit snugly about the cans and lie smooth and even thereon and to cause them to be effectively attached throughout their entire lengths and widths.

The paper of which labels are made stretches when damp and again contracts when it dries, so that unless the labels are tempered just right at the time they are applied to the cans, they will expand after application. One of the objects of my invention is to produce a simple means for so preparing the labels in advance of their application that they will remain tightly attached to the cans and therefore be free from looseness or blisters.

In preparing the labels for application to the cans I moisten them thoroughly and as this permits the paper to be stretched easily it assists in carrying out another object of my invention which is to fit labels nicely about cans having their ends closed by means of caps whose flanges lie outside of the body of the cans and offsetting or enlarging the portions at the ends of the cans so as to make them overlie the flanges of the caps smoothly and with the caps form a sealed wrapper.

Heretofore the best labeling work has been done by hand because this permits the labels to be placed on the cans gently but firmly, and be progressively rubbed or worked about the cans with a yielding pressure. One of the objects of my invention is to produce a machine in which the actual operation of attaching the label about a can will be performed in such a manner as to bring into play forces which will create conditions similar to those which exist in the old hand process.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of a machine arranged in accordance with a preferred form of my invention;

Fig. 2 is a top plan view of the machine or rather a section on line 2—2 of Fig. 1;

Figs. 3, 4 and 5 are top plan views on enlarged scale of the left hand end of the central portion, and of the right hand end of the machine as it appears in Figs. 1 and 2;

Fig. 6 is a top plan view of the central portion of the machine on a still larger scale, some of the superstructure being omitted, or a section on line 6—6 of Fig. 9;

Fig. 7 is a side elevation on an enlarged scale of the central portion of the machine;

Fig. 8 is a vertical longitudinal section through the central portion of the machine;

Fig. 9 is a section taken approximately on line 9—9 of Fig. 7;

Fig. 10 is a section on line 10—10 of Fig. 5;

Fig. 11 is a section taken approximately on line 11—11 of Fig. 5;

Fig. 12 is a view on an enlarged scale of the devices for wrapping the labels about the cans, detached from the machine;

Fig. 13 is an enlarged section through one of the label-grippers on the label conveyer;

Fig. 14 is a side view of a portion of the driving mechanism, illustrating the means for stopping the feed while the label is being affixed and the means for opening the label-grippers on the conveyer; and Figs. 15 and 16 are sections on an enlarged scale, looking in opposite directions, one taken just beside one of the loose pulleys and the other on a plane passing through the pulley.

In the drawings I have illustrated only a single embodiment of my invention and, since it contains a considerable number of parts, I shall, for the sake of brevity, confine the detailed description to this single embodiment although the structural details of some of the novel features may be widely varied and such features may be employed to advantage in different relations and under different conditions than those illustrated and out of combination with each other.

Referring to the drawings, 1 represents a long horizontal trough supported on a suitable frame, 2, which is in turn supported on pedestals, 3, so as to be adjustable to different heights. The trough is intended to contain water. Extending transversely above the trough at opposite ends thereof are two shafts, 4 and 5. On each shaft are two sprocket wheels, 6, 6, spaced apart so as to lie just inside the sides of the trough and of sufficient diameter to extend down near the bottom of the trough. Two endless sprocket chains, 7, 7, extend lengthwise of the trough and pass over corresponding sprocket wheels at opposite ends of the same. The upper runs of the chains lie above the trough and are kept horizontal by suitable longitudinal supporting tracks or rails, 8, 8, while the lower runs of the chains lie in the trough. The chains are connected together at regular intervals by cross bars, 9.

At a short distance from one end of the trough and above the same is a receptacle, 10, for a pile of labels. The outer end wall, 11, of the receptacle is inclined so as to make an acute angle with the bottom and, where it meets the bottom, there is a narrow slot, 12, extending the full width of the receptacle. The wall 11 is hinged to the receptacle as indicated at 13, so that it may be swung back out of the way and be adjusted up and down, to vary the width of the slot. The downward movement of the wall may conveniently be limited by screws, 14, which engage with the frame, 2, the screws being adjustable in the vertical direction.

The sprocket chains constitute label carriers which carry the labels through the water in the trough and deliver them in a tempered and paste-coated condition to the label applying means. Each of the cross bars, 9, is therefore provided with gripping means adapted to grasp one end of a label and hold it on the carrier until it is needed. These gripping means which are best shown in Figs. 13 and 14 in addition to the plan views, consist of U-shaped plates, 15, slipped over the bars, 9, with one arm of each above and the other below the corresponding bar; there being preferably a plurality on each bar to insure that the labels will be held straight. The arms of the plates are spaced apart at their free ends a distance somewhat greater than the thickness of one of the bars so as to allow the grippers to rock; each gripper plate being fastened in place by a screw, 16, passing into the bar through a sufficiently large hole in the yoke of the gripper plate to avoid interfering with the rocking motions. The free edge of the upper arm of each gripper plate is preferably bent downwardly a trifle so that a line contact will be obtained with a label lying between it and the bar. A spring, 17, between the lower arm of each gripper plate and its supporting bar, tends constantly to hold the upper arm against the top of the bar. The gripper plates are so placed on the bars that when the bars are brought adjacent to the slot in the label receptacle, and the labels are slipped one at a time through the slot the advance ends of the labels pass between the upper arms of the plates and the bars; means being provided for holding the gripping ends of the gripper plates raised as this point is reached. The means for opening the grippers is best shown in Figs. 3 and 14. From the rails, 8, somewhat beyond the outer end of the label receptacle, is hung a U-shaped bar, 18, having a long yoke which extends across the machine, and short supporting arms. On this bar are fingers, 19, spaced apart in the same way that the gripper plates of the grippers are spaced and each adapted, when a gripper is in its receiving position, as indicated in Fig. 14, to engage with the under arm of the corresponding gripper plate when the supporting member, 18, is swung in the proper direction, and thus opening the gripper. A spring, 20, tends constantly to swing the gripper-opener into its working position, the spring being, however, overcome and the opener swung into its idle position so as to allow the grippers to close on the labels by means, suitably actuated and timed, to be hereinafter described.

After a label has been placed on the conveyer it is carried down into and throughout the entire length of the trough, leaving the trough at the end opposite to that at which it entered and being carried up over a roller, 22, on the shaft 5; the surplus water being squeezed out by a suitable wringer roller, 23, pressing against the roller 22. The circumferential length of the roller 22 is just equal to the distance between centers of adjacent gripper bars and the roller has therein a longitudinal groove, 24, adapted to receive each gripping bar as it reaches the roller; thus preventing interference between the grippers and the roller. A suitable paste-applying device, 25, may conveniently be placed over the roller, 22, for applying paste to the label before the latter begins to dry.

After having been soaked in the trough and covered on its upper face with paste, the label travels along the machine until it almost reaches the starting point, where it is taken from the conveyer and applied to a can.

The label is supported while on the upper rim of the conveyer by means of a series of stationary narrow bars or rails, 26, spaced apart from each other and extending lengthwise of the machine. At the end of the machine where the label enters the trough the shaft, 4, is provided with a series of spaced disks, 27, to the common cylindrical surface of which the bars or rails, 26, are tangential, thus insuring that the label will enter the trough without buckling as it turns the corner.

One of the principal features of my invention is the immediate means for placing the labels on the cans. This means, as best shown in Figs. 6, 8 and 12, consists of two sets of jaws, 28 and 28ª, shaped to fit snugly about a can to be labeled. In the arrangement illustrated the cans to be labeled are round and therefore the jaws are approximately semi-circular. The jaws are arranged in opposed pairs at some distance from the inner end of the label receptacle, each pair lying between two adjacent rails or bars, 26, enough of the jaws being provided to make the width of each group at least as long as the width of the label measured in the direction of the length of the can. The jaws of each group are fixed at their ends nearest the other jaws to a transverse rock shaft, these rock shafts, indicated at 29 and 30, lying parallel with each other and somewhat below the tops of the rails or bars 26; the shafts being spaced only far enough apart to prevent interference between the adjacent ends of the jaws of each pair. The jaws are so arranged that when the rock shafts are turned to swing the jaws down below the plane of the tops of the rails or bars, 26, the concave sides of the jaws are up while, upon turning the rock shafts to raise the jaws, they will coöperate to form a tunnel extending across the machine in position to embrace a can lying on the tracks or bars just above the inner ends of the jaws. Instead of constructing the jaws so that they will form a cylindrical tunnel when the free ends meet, I prefer to make the angular length of the jaws a little longer than required for this purpose so that it would be necessary for them to overlap slightly at their ends in order to make a cylindrical opening. This insures, as will hereinafter appear, that there will be no point on the can where an effective labeling pressure will not be applied. The jaws of each pair are connected together by a rubber strip or band, 31, which extends continuously from the free end of one jaw to the free end of the opposite jaw, being attached only at its ends and being of such length that it is taut or at least does not sag very much when the jaws are open. It will be seen that each rubber strip is only slightly longer than twice the diameter of the can to be labeled so that, if the jaws are to close upon a can, the rubber must be gradually stretched. In Fig. 12 of the drawing I have illustrated the operation of affixing the label, the jaws being shown in their receiving or "down" positions in dotted lines, a label, 32, having been laid upon the rails or bars 26 just over the jaws, and a can, 33, having been brought and held just over the center of the jaw mechanism. As the jaws are swung up, first the jaw, 28, and then the jaw, 28ª, the rubber strips first press the middle of the moist, paste-covered label against the bottom of the can and, as the jaws continue their upward movements, the strips stretch and draw the label up and around the can; the action being just the same as though the label were placed on the can by hand, touching the can only along a line at the middle of the label, and the two hands of the operator were then pressed against the label at the line of attachment and were drawn or pushed in opposite directions around the can, progressively attaching the label and stretching and drawing it with a firm but yet a yielding pressure which insures perfect application of the label. It will now be seen that by proportioning the jaws as heretofore described, and actuating one somewhat in advance of the other, one-half of the label will be fully attached and will then be over-lapped for a short distance by the other half, leaving no zone in which complete attachment of the label has not been effected.

The jaws normally lie in their receiving or down positions, the supporting shafts being suitably counterweighted, as indicated at 34, to act with the weight of the jaws; the counterweights being, moreover, so placed that the jaws will automatically drop back from their raised positions if the shafts are left free to turn back; suitable stationary rests or supports, 35, being provided beneath the jaws for receiving and supporting them.

The labels are brought into operative relation to the affixing means by the conveyer, there being a stationary cam or series of cams, 36, just beyond the affixing means, by which the gripper plates are engaged so as to open the grippers whenever one of the latter reaches a point where it has caused a label, (if it contains one,) to be laid down in the proper position on the affixing means; thus releasing the label and permitting it to be applied about a can as heretofore explained.

The cans are delivered, held while being labeled, and removed by a rotary holding mechanism arranged above the label-affixing means. This feature is perhaps best illustrated in Figs. 4, 8 and 9. Supported in suitable stationary uprights, 37, extending upward from the frame of the machine at opposite sides thereof, is a transverse shaft, 38. On the shaft are fixed two four-armed spiders, 39, spaced apart a distance considerably greater than the length of a can and disposed similarly to each other angularly of the shaft. Projecting through the outer end of each arm of each spider is a plunger, 40, axially alined with the corresponding plunger on the opposite spider. On the inner end of each plunger is a disk-like head, 41, between which and the spider is a compression spring, 42. On the outer end of each plunger is a laterally-projecting cam finger, 43. Normally the springs hold the plungers in such positions that the fingers thereon engage with the outer sides of the spiders, the heads on opposed plungers being at this time spaced apart a distance less than the length of a can so that if a can is inserted between two of the heads it will be securely clamped between them. On the side of the uprights, 37, facing toward the approaching labels on the conveyer are arc-shaped plates, 44, so disposed that as each individual can holder has passed about ninety degrees beyond the label-attaching point, the cam fingers on the plungers thereof are engaged by the plates, drawing the can-holding heads apart and releasing the can; this condition of the can-holding heads being maintained until the holder has traveled a distance approximately one hundred and eighty degrees from the label-affixing point, or, in other words, is at the top of its travel.

A suitable can-delivering chute, 45, is arranged in position to supply cans, as they are needed, to the topmost, open holder; curved arms, 46, extending down from the chute and supporting the lowermost can of a stack of cans, 33, in position to be gripped by the adjacent holder when the cam fingers thereon pass off of the plates 44. In order to prevent the can from falling off the arms 46, and at the same time allowing it to be carried away in one of the holders, I hang a long counterweighted finger, 47, in front of the chute, the lower end of the finger extending down in front of a can on the arms, 46, and pressing against the can with sufficient force to hold it in place until it is gripped in the holding apparatus and swings the holding finger back.

Above what may be termed the bed of the machine, that is above the rails or bars 26 and the upper rim of the conveyer, is a can-receiving chute, 48, adapted to receive the labeled cans at the point where they are released, the chute being slightly inclined so that the cans will roll down the same to a suitable discharge point. On the end of the chute, 48, next to the rotary can-holding mechanism is hung by its arms a U-shaped member, 49, which embraces the end of the chute, its arms being pivoted to the sides of the chute and its yoke member underlying the chute. On the yoke or transverse member of the device, 49, are a suitable number of laterally-projecting curved fingers or hooks, 50, adapted to be swung from an idle depending position out of the way of cans in the holding mechanism to and beyond a position in which they underlie a can in the holder which is just about to be opened; thus permitting each labeled can, as it is released by its holder, to be gently transferred to the discharge chute.

Suitable driving and operating means are provided for feeding the conveyer step by step; holding the grippers open long enough to receive a label from the label receptacle and close it again before the conveyer starts; operating the can-delivery means while the conveyer is traveling, so as to have cans in the label-affixing positions at the proper times; operating the label affixer while the conveyer is at rest and a can is being held in the label-receiving position; and operating the can-receiving device for taking the cans and placing them in the discharge chute as they are released from the holders. The means illustrated for carrying out these various operations are as follows:

On the shaft 4 is loosely arranged a driving pulley, 52, having on the inner side a small pulley, 53. Between the label receptacle and the affixing means is mounted a transverse shaft, 54, having thereon a loose pulley, 55. A belt, 56, passes over the pulleys 53 and 55. The pulley 55 like the pulley 53 is loose on its shaft. Fixed upon each of the shafts 52 and 54, beside the corresponding pulley is a disk, 57, having on the side thereof a pawl, 58, mounted on a short shaft, 59, which extends transversely through the disk as best shown in Figs. 14 to 16. The pulleys 53 and 55 are in the form of shallow cups closed by the disks 57, and the inner surface of the cylindrical portions are provided with notches, 60, distributed about the same. On the ends of the shafts 59 which project through the disks are fixed laterally-projecting arms, 61, adapted to be engaged in the notches, 60, of the surrounding pulley so as to produce a clutching connection between the pulley and the disk. A spring, 62, behind each of the arms 61 tends normally to hold them in operative clutching position so that unless interfered with in some way each of the pulleys will be clutched to its shaft. The means for unclutching the pulleys from their shafts consists of two vertical rods, 63 and 64, mounted in suitable bearings in proximity to the pulleys 53 and 55, respectively, so as to be rotatable about vertical axes. The upper end of each rod is bent laterally as indicated at 65 and is provided with a vertically adjustable head, 66. The parts are so proportioned that they may be swung between a position in which they lie in the path of movement of the pawls 58 to a position in which they do not interfere with the free movement of these pawls. By properly controlling the rods 63 and 64 either of the two pulleys may be clutched to its shaft while the other remains unclutched, or both may be clutched to their shafts at the same time. On the lower end of the shaft 63 are two laterally-projecting arms, 67 and 68. Between the arm 67 and the member 18 of the gripper-opening device is an actuating rod, 69, of such length that it will be placed in gripper-opening position when the rod 63 is swung into the path of the corresponding pawl 58 and will be returned to its idle position when the rod 63 is swung into its idle position. The arm, 68, is connected to one end of a rod, 70, the other end of which extends to and is supported by the shaft 54, being provided with a loop-like portion, 71, surrounding the shaft and having on one side a projecting stud, 72, which is adapted to be engaged by a suitable cam, 73, on the shaft to operate the rod 70 and thus cause the controlling rod 63 to be turned. The connection between the rod 70 and the shaft 54 serves to turn the rod 63 out of its clutch-releasing position, it being shifted into its clutch-releasing position by the spring 20 connected to the gripper-opening device.

On the ends of the shaft 54 are fixed two disks, 75 and 76, each provided with a laterally-projecting roller, 77, revoluble about an axis parallel with the axis of the shaft. Surrounding the shaft at the sides of the disks 75 and 76 on which the rollers lie, are loop-like heads, 78, each forming one end of a connecting rod indicated as a whole at 79. The opposite end of each connecting rod is connected to a suitable crank arm, 80, on one of the shafts 29 and 30. Each of the members 78 is provided with separated oppositely disposed lugs, 81 and 82, adapted to be alternately engaged by the corresponding roller, 77, so that each connecting rod will be moved through a complete cycle during each revolution of the shaft 54, but will not be moved continuously but only during two short portions of the angular movement of the roller at diametrically opposed points. The disk, 75, is set so as to bring its roller slightly in advance of the roller on the disk 76, thereby causing the shaft 29 and the label-affixing jaws, 28, carried thereby to be operated slightly in advance of the shaft 30 and the jaws 28ª as heretofore described. The controlling rod, 64, for the clutch between the pulley 55 and the shaft 54 is actuated in one direction by means of a spring, 83, and in the opposite direction, that bringing it into its idle position, by a rod, 84, one end of which is connected to an arm, 85, projecting laterally from the rod 64 and having at its other end, as best illustrated in Fig. 10, a loop, 86, similar to the loops 71 and 78, surrounding the shaft 5 at the end of the machine opposite that at which the main driving pulley is located. On the loop 86 is a lateral projection, 87, adapted to be engaged by a cam, 88, on the shaft 5 so as to move the rod 84 in the proper direction to bring the member 64 into its idle position. A suitable sprocket chain, 90, passes over a sprocket wheel, 91, on the shaft 38 of the can carrier and a sprocket wheel, 92, on the shaft 5. On the end of the shaft 5 opposite that on which the sprocket wheel 92 is located is a crank arm, 93, to which is connected one end of a connecting rod, 94, whose other end extends to and is connected to an extension, 95, of one of the arms of the can-receiving and shifting device 49.

The operation of the entire machine, briefly stated, is as follows: Assuming that the driving pulley is unclutched from the shaft 4 and the label conveyer is standing idle, there is a label gripper adjacent to the slotted end of the label receptacle, so that the operator may feed a label out through the slot in the receptacle and into the gripper. While the conveyer is standing still, the actuating rod, 84, which controls the clutch between the shaft 54 and its pulley is in its forward position and therefore the shaft 54 and its pulley are clutched together and the shaft is being rotated, thus operating the label-affixing devices as heretofore described. When the label has been affixed the cam 73 shifts the rod 70 and moves the controlling rod 63 for the clutch between the shaft 4 and its pulley to its idle position, causing the shaft 4 and its pulley to be clutched together and consequently causing the conveyer to start moving. The act of shifting the clutch controlling rod, 63, also shifts the gripper-opening device so as to allow the gripper which has just received a label to be closed upon the label, whereby the label will be firmly gripped to the conveyer before the movement of the conveyer begins. When the conveyer begins to move, it turns the shaft 5 and causes the cam, 88, to move away from the projection, 87, releasing the rod 84 so as to permit the spring 83 to swing the clutch controlling rod 64 into the position to cause the shaft 54 to be unclutched from its pulley; the shaft 54 remaining idle until the controlling rod 64 is again brought to its release position. As soon as the shaft 5 begins to revolve it also causes the rotary can-holding mechanism to revolve, the parts being so proportioned and timed that the movement of the can-holding mechanism will be through an angle of ninety degrees during each step made by the conveyer. The rotation of the shaft 5 also causes the swinging can-receiving device, 49, to be actuated in proper time relation to the rotary can-holding means to bring the hooks or arms, 50, beneath the labeled can which is about to be released, and causes the can to roll down into the receiving chute, 48. Before the shaft 5 has completed a revolution, the rod 84 is actuated so as to cause the shaft 54 and its pulley to be clutched together again and permit the controlling devices for the clutch-controlling rod 63 to be brought into play in time to stop the movement of the conveyer after the shaft 5 has made a complete revolution, that is after the conveyer and the labels have been fed forward a complete step and before the actual operation of affixing the label begins.

The cycle of operations just described may be repeated indefinitely, each label being carried forward step by step through the water in the trough and being finally deposited on the affixing devices in a tempered, paste-covered condition, where it is attached to and carried away with a can.

If desired, a suitable cross conveyer, 99, may be placed at the rear end of the can-receiving chute, 48, as shown in Fig. 5, to carry the labeled cans away. However, this is no part of my invention, as the cans may be taken away in any manner desired.

While I have illustrated and described with particularity only a single preferred form of my invention I do not desire to be limited to the exact structural details thus illustrated and described; but intend to cover all forms and arrangements which come within the terms employed in the definitions of my invention constituting the appended claims.

I claim:

1. In a label-affixing machine, an elongated trough for containing water, an endless conveyer extending lengthwise of the trough and having the lower half lying in the trough, means on the conveyer for holding a label thereon while it is being carried through said trough, and means for removing the labels from the convever after they leave the trough and applying them to the work to be labeled.

2. In a label-affixing machine, a receptacle for containing water, means for passing a label through the said receptacle, means for applying paste to the label after it leaves the receptacle, and means for affixing the paste-covered label to the work.

3. In a label-affixing machine, an elongated trough for containing water, means for passing a label lengthwise through the trough, means for applying paste to the label after it leaves the trough, and means for affixing the label to the work.

4. In a label-affixing machine, a trough for containing water, means for passing a label through the trough, means for applying paste to the label after it leaves the trough, means for bringing the work to be labeled in proximity to the paste-covered label, and means for wrapping the label about the work.

5. In a label-affixing machine, a trough for containing water, an endless conveyer having a portion lying in the trough, grippers on the conveyer for holding a label thereto, a receptacle for labels adjacent to said conveyer, label-affixing means arranged adjacent to the conveyer, and means for moving the conveyer intermittently and bringing it to rest with grippers lying in proximity to said receptacle and to said affixing means.

6. In a label-affixing machine, an elongated trough adapted to contain water, an endless conveyer extending lengthwise of and having its lower half lying in the trough, grippers distributed along the conveyer for holding individual labels thereon, means above one end of the trough for applying paste to the labels as they leave the trough, and means for removing the labels from the conveyers and applying them to the work.

7. In a label-affixing machine, an elongated trough adapted to contain water, an endless conveyer extending lengthwise of and having its lower half lying in the trough, grippers distributed along the conveyer for holding individual labels thereon, means above one end of the trough for applying paste to the labels as they leave the trough, a support for a supply of labels in the vicinity of the other end of the trough, label-affixing means at an intermediate point, and means for opening the grippers when they reach the label-affixing point and the label-supplying point.

8. In a label-affixing machine, means for maintaining a body of water, means for immersing a label in such body long enough to permit it to become thoroughly soaked, and means for affixing it to the work after being removed from the water.

9. In a label-affixing machine, means for maintaining a body of water, means for immersing a label in such body long enough to permit it to become thoroughly soaked, means for applying paste to the label after it leaves the water, and means for affixing the label to the work.

10. In a label-affixing machine, a conveyer comprising two parallel endless members arranged beside each other at a distance apart at least as great as the width of the labels to be affixed, cross bars connecting said members together at regular intervals, gripping devices on said bars for grasping the labels at one end, and means movable through the upper run of the conveyer for lifting the labels therefrom and affixing them to the work.

11. In a label-affixing machine, a conveyer comprising two parallel endless members arranged beside each other at a distance apart at least as great as the width of the labels to be affixed, cross-bars connecting said members together at regular intervals, gripping devices on said bars for grasping the labels at one end, parallel separated rails lying between and parallel with the upper portions of said members, for supporting the labels as they are carried along by the upper portion of said conveyer, and means movable through the spaces between said rails for lifting labels therefrom and affixing them to the work.

12. In a label-affixing machine, a conveyer comprising two parallel endless members arranged beside each other at a distance apart at least as great as the width of the labels to be affixed, cross-bars connecting said members together at regular intervals, gripping devices on said bars for grasping the labels at one end, parallel separated rails lying between and parallel with the upper portions of said members, for supporting the labels as they are carried along by the upper portion of said conveyer, label-affixing jaws arranged in pairs in the spaces between said rails, and means for actuating said jaws to lift a label from the rails and affix it to the work.

13. In a label-affixing machine, an endless conveyer having devices thereon for grasping labels at one end, affixing means movable through the upper run of the conveyer to lift the labels therefrom and apply them to the work, and means acting on said devices when the labels reach the aforesaid affixing means to release the labels.

14. In a label-affixing machine, an endless conveyer having openings therethrough at least as large as the labels to be operated upon, a device at one end of each of said openings for gripping one end of the labels, label-affixing means located beneath the upper run of the conveyer and movable through the said openings to lift the labels and affix them to the work.

15. In a label-affixing machine, an endless conveyer having openings therethrough at least as large as the labels to be operated upon, a device at one end of each of said openings for gripping one end of the labels, label-affixing means located beneath the upper run of the conveyer and movable through the said openings to lift the labels and affix them to the work, and means acting on each said device when the corresponding opening registers with the label-affixing means to cause it to release the label held thereby.

16. In a label-affixing machine, an endless conveyer having openings therethrough at least as large as the labels to be operated upon, a device at one end of each of said openings for gripping one end of the labels, separated parallel rails extending longitudinally just below the upper run of the conveyer to support the trailing labels, and label-affixing jaws movable upward through the spaces between the rails and through said openings in the conveyer for affixing the labels to the work.

17. In a label-affixing machine, an elongated trough adapted to contain water, an endless conveyer extending lengthwise of the trough and having its lower run lying in the trough, said conveyer having openings therethrough at least as large as the labels to be operated on, means for detachably holding the labels on the conveyer in registration with said openings, a series of separated parallel rails extending longitudinally of the conveyer just below the upper run thereof for supporting the passing labels, and means movable through the spaces between said rails and through said openings to lift the labels and affix them to the work.

18. In a label-affixing machine, an elongated trough for containing water, an endless conveyer extending lengthwise of and having its lower half lying in said trough, means on the conveyer for holding labels thereon, means arranged above the trough for bringing cans one at a time in proximity to the upper run of the conveyer, and means for removing the labels from the conveyer and affixing them about the cans when the latter are brought into proximity to the conveyer as aforesaid.

19. In a label-affixing machine, an elongated trough for containing water, an endless conveyer extending lengthwise of and having its lower half lying in said trough, means on the conveyer for holding labels thereon, a can holder arranged above the trough so as to be rotatable about a transverse horizontal axis, said holder being so constructed and arranged as to bring a can therein in proximity to the upper run of the conveyer, and means for lifting a label from the conveyer and affixing it to a can in proximity to the conveyer as aforesaid.

20. A label-affixing device comprising two curved jaws lying end to end, means for supporting said jaws so as to permit them to swing from and toward each other about said ends, a flexible elastic member connected to the free ends of said jaws and having a length shorter than the circumference of a piece of work to be labeled, the free end of one of said jaws being permitted to swing past the point of extreme inward movement of the free end of the other jaw, and means for actuating said jaws so as to cause said flexible elastic member to be gradually pressed against and drawn about a piece of work from the middle of said member toward the ends and one of said jaws to be retracted slightly at the end of its inward movement so as to hold the major portion of the corresponding half of said flexible member in contact with the work while the other end of said member is making an overlapping movement.

In testimony whereof, I sign this specification.

GEORGE HOEPNER.